(12) United States Patent
Wang et al.

(10) Patent No.: US 11,740,044 B2
(45) Date of Patent: Aug. 29, 2023

(54) GEOLOCATION-REPORTING WEAPON-TRACKING DEVICE

(71) Applicant: INPIXON, Palo Alto, CA (US)

(72) Inventors: Li Wang, Valley Village, CA (US); Andrew Hamish Duncan, Los Angeles, CA (US); Patrick E. Bertagna, Los Angeles, CA (US); Richard Antonio Carranza Montenegro, Rosemead, CA (US); Shirish Tangirala, Palo Alto, CA (US)

(73) Assignee: INPIXON, Palo Alto, CA (US)

( * ) Notice: Subject to any disclaimer, the term of this patent is extended or adjusted under 35 U.S.C. 154(b) by 0 days.

(21) Appl. No.: 17/487,181

(22) Filed: Sep. 28, 2021

(65) Prior Publication Data

US 2022/0026168 A1    Jan. 27, 2022

Related U.S. Application Data

(63) Continuation of application No. 16/591,423, filed on Oct. 2, 2019, now Pat. No. 11,156,419.

(60) Provisional application No. 62/740,378, filed on Oct. 2, 2018.

(51) Int. Cl.
  *F41A 17/06*    (2006.01)
  *G01S 19/13*    (2010.01)
  *F41G 1/35*     (2006.01)

(52) U.S. Cl.
  CPC .......... *F41A 17/063* (2013.01); *F41A 17/066* (2013.01); *F41G 1/35* (2013.01); *G01S 19/13* (2013.01)

(58) Field of Classification Search
  CPC ...... F41A 17/063; F41A 17/066; F41A 19/01; F41A 17/06; F41A 25/00; F41A 27/00; F41G 1/35; F41G 11/003; G01S 19/13; F41C 33/029
  USPC .......................................................... 42/1.01
  See application file for complete search history.

(56) References Cited

U.S. PATENT DOCUMENTS

| 6,643,968 B2 * | 11/2003 | Glock ..................... F41A 19/62 42/84 |
| 8,966,797 B2 * | 3/2015  | Carlson .................. F41A 19/25 42/70.11 |
| 9,261,365 B2   | 2/2016  | Rothschild |
| 9,841,249 B1 * | 12/2017 | Nicks .................... H02J 7/0045 |

(Continued)

*Primary Examiner* — Joshua E Freeman
(74) *Attorney, Agent, or Firm* — Pillsbury Winthrop Shaw Pittman LLP

(57) ABSTRACT

Provided is a method that includes determining a device geolocation based on a satellite signal received by a weapon-tracking device and receiving a sensor reading using a sensor attached to the weapon-tracking device, wherein the sensor is sensitive to a use of the weapon. The instructions include determining that a change in the sensor reading satisfies a change threshold and, in response to a determination that the change threshold is satisfied, transmitting device state data to a wireless signal receiver via a wireless signal, wherein the device state data comprises a device identifier and the device geolocation. The instructions further include storing the device identifier and the device geolocation in a data server in communication with the wireless signal receiver and transmitting a message based on the device identifier and device geolocation to a client from the data server.

30 Claims, 12 Drawing Sheets

(56) References Cited

U.S. PATENT DOCUMENTS

| | | | |
|---|---|---|---|
| 10,648,781 B1* | 5/2020 | Behiel | F41A 33/00 |
| 10,712,116 B1* | 7/2020 | Baxter | F41A 33/00 |
| 2004/0099134 A1* | 5/2004 | Gotfried | F41A 17/066 |
| | | | 89/1.11 |
| 2005/0155420 A1* | 7/2005 | Johnson | F41A 19/01 |
| | | | 73/167 |
| 2011/0119979 A1* | 5/2011 | Gussalli Beretta | F41A 17/063 |
| | | | 342/146 |
| 2012/0125189 A1* | 5/2012 | McLean, III | G06Q 10/08 |
| | | | 42/106 |
| 2014/0202058 A1* | 7/2014 | Zhou | F41A 17/063 |
| | | | 42/70.11 |
| 2014/0230296 A1* | 8/2014 | Kuparinen | F41A 17/06 |
| | | | 42/1.01 |
| 2015/0019129 A1* | 1/2015 | Sheard | G01C 21/10 |
| | | | 701/472 |
| 2015/0075054 A1* | 3/2015 | Barger | F41A 23/18 |
| | | | 29/525.02 |
| 2015/0113851 A1* | 4/2015 | Bensayan | F41A 19/01 |
| | | | 42/117 |
| 2015/0253109 A1* | 9/2015 | Wichner | F41A 17/08 |
| | | | 434/19 |
| 2015/0369554 A1* | 12/2015 | Kramer | H04N 9/8205 |
| | | | 386/227 |
| 2016/0021329 A1* | 1/2016 | Sakiewicz | G01S 19/17 |
| | | | 386/227 |
| 2016/0033221 A1* | 2/2016 | Schmehl | F41A 33/00 |
| | | | 42/90 |
| 2016/0069643 A1* | 3/2016 | Lyren | F41G 1/467 |
| | | | 345/589 |
| 2016/0216082 A1* | 7/2016 | Downing | F41G 3/06 |
| 2017/0010062 A1* | 1/2017 | Black | F41J 5/10 |
| 2017/0146319 A1* | 5/2017 | Lyren | F41A 17/063 |
| 2017/0248388 A1* | 8/2017 | Young | F41A 17/063 |
| 2019/0003804 A1* | 1/2019 | Deng | F41A 35/00 |
| 2019/0293375 A1* | 9/2019 | Urwin-Wright | G01V 3/10 |
| 2020/0003511 A1* | 1/2020 | Deng | F41A 17/06 |
| 2020/0109905 A1* | 4/2020 | Black | G08B 13/2448 |
| 2020/0355456 A1* | 11/2020 | Deng | H04N 5/23203 |
| 2020/0355463 A1* | 11/2020 | Piccioni | A45F 5/021 |
| 2021/0199400 A1* | 7/2021 | Weiss | F41A 17/08 |

* cited by examiner

GEOLOCATION-REPORTING WEAPON-TRACKING DEVICE

CROSS-REFERENCE TO RELATED APPLICATIONS

This application is a continuation of U.S. Non-Provisional patent application Ser. No. 16/591,423, filed 2 Oct. 2019, titled "Geolocation-Reporting Weapon-Tracking Device." U.S. Non-Provisional patent application Ser. No. 16/591,423 claims the benefit of U.S. Provisional Patent Application 62/740,378, filed 2 Oct. 2018, titled "Rail Mounted Tracking Device For Firearm." The entire content each of the aforementioned patent-filings are hereby incorporated by reference.

BACKGROUND

1. Field

This disclosure relates generally to tracking devices and, more particularly, to weapon-tracking devices.

2. Description of the Related Art

Electronic tracking devices provide valuable information, such as geolocation, and are of use in a diverse range of applications. The prevalence of the global positioning system (GPS), mobile power systems, and wireless signal transmission systems increase the capabilities and possible uses of tracking devices. These technologies may be implemented in various ways to increase the accuracy, reliability, or frequency of tracking data provided by tracking devices.

SUMMARY

The following is a non-exhaustive listing of some aspects of the present techniques. These and other aspects are described in the following disclosure.

Some aspects include a process that includes: determining a geolocation of a weapon-tracking device attached to a weapon based on a wireless signal received by the weapon-tracking device; receiving, with a processor of the weapon-tracking device, a sensor reading using a sensor attached to the weapon-tracking device, wherein the sensor is sensitive to a use of the weapon; determining that a change in the sensor reading satisfies a change threshold; in response to a determination that the change threshold is satisfied, transmitting device state data to a wireless signal receiver via another wireless signal, wherein the device state data comprises a device identifier and the device geolocation; storing the device identifier and the device geolocation in a data server that receives the device identifier and the device geolocation via the wireless signal receiver; and transmitting a message based on the device identifier and device geolocation to a client device, wherein the message indicates a time associated with the use of the weapon.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
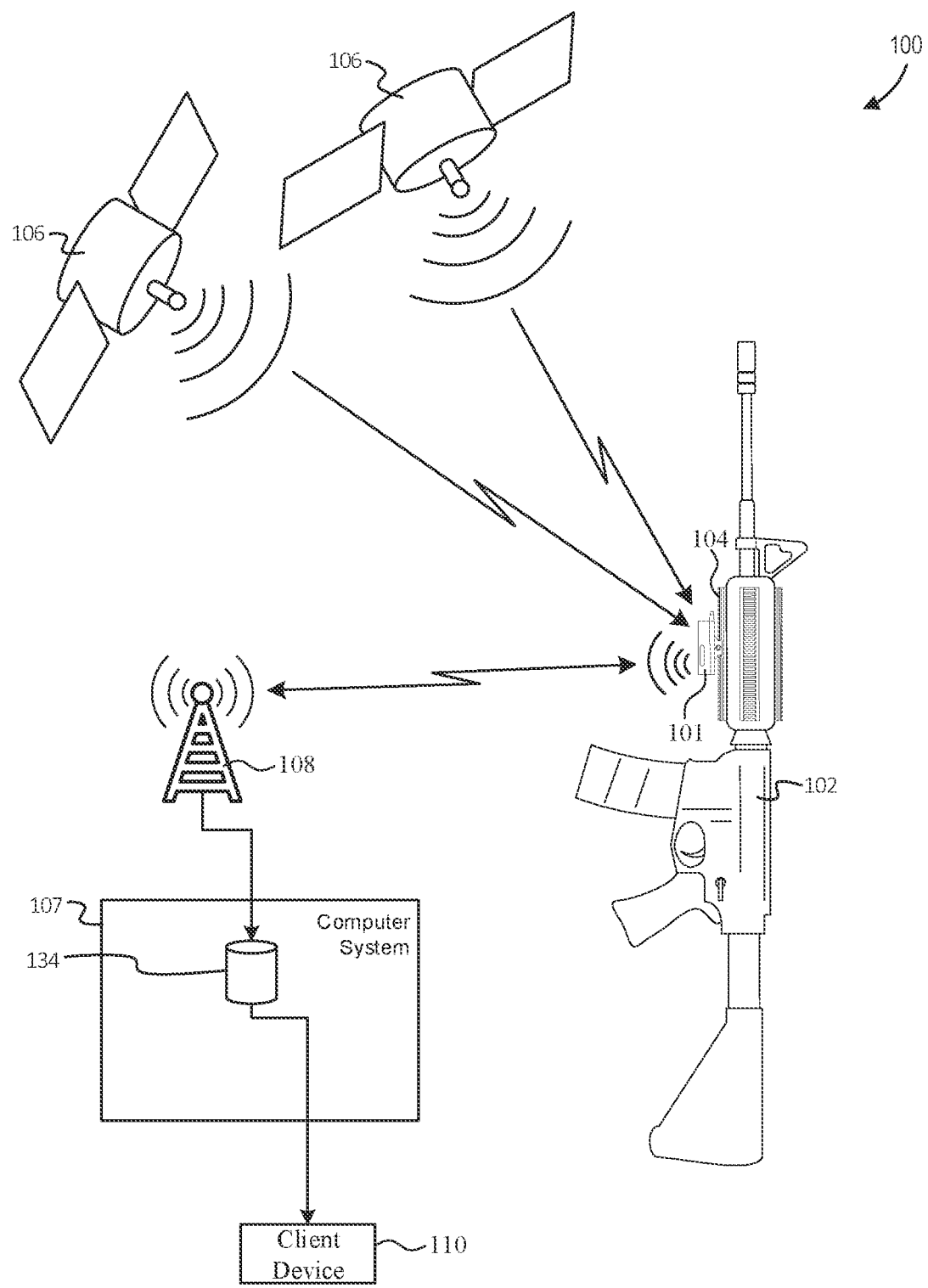
FIG. 1 is a schematic diagram of an environment in which various components for weapon tracking may be implemented with the present techniques, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of embedded systems. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 illustrates an example weapon-tracking system 100 having a computer system 107 to receive data indicating a state of a weapon-tracking device ("device state data") and perform operations based on the device state data. In some embodiments, device state data may include information about a weapon-tracking device 101, a weapon 102 attached to the weapon-tracking device 101, a tracking device geolocation, and the like. For example, the weapon-tracking device 101 may transmit device state data including a geolocation, times associated with a firing or use of the weapon 102, accelerometer or sound recording data associated with the firing of the weapon 102, a luminosity value or change in luminosity, and the like. While the weapon 102 is shown as a rifle in FIG. 1, the weapon-tracking device 101 may be attached to other weapons such as a handgun, a long gun, a carbine, a submachine gun, a shotgun, and the like. In some embodiments, the weapon-tracking device may be attached to other weapons such conducted electrical weaponry, bows, riot guns, flamethrowers, and the like.

In some embodiments, the weapon-tracking device 101 may use satellite navigation signals from one or more satellite navigation systems such as the global positioning system (GPS) or global navigation satellite system (GLONASS). For example, the weapon-tracking device 101 may use satellite navigation signals from the GPS satellites 106 to determine a device geolocation based on an acquired set of satellite signal sensor readings. The weapon-tracking device 101 may then transmit device state data that includes the device geolocation to the wireless signal receiver 108 via a wireless signal from an antenna of the weapon-tracking device 101. In some embodiments, the weapon-tracking device 101 may use signals from a plurality of satellite navigation systems to determine a device geolocation. The device geolocation may indicate a geolocation of the weapon 102, where the weapon-tracking device 101 may be mounted on a rail 104 of the weapon 102. In some embodiments, the rail 104 may include a rail type of Picatinny rail (e.g., MIL-STD-1913, STANAG 2324, etc.). Alternatively, or in addition, the rail 104 may include other rail types may include Dovetail, Weaver, Warsaw, Keymod, M-LOK, NATO/STANAG 4694 rails, and the like.

In some embodiments, the weapon-tracking device 101 may communicate with other electronic devices, where the other electronic devices may be used to determine a set of indoor geolocations of the weapon-tracking device 101. For example, the weapon-tracking device 101 may emit a WiFi signal or cellular signal that is then used by a set of indoor positioning devices to determine an indoor position (e.g. a particular position within a shopping mall) of the weapon-tracking device 101. In some embodiments, the weapon-tracking device 101 may automatically switch to using an indoor positioning system to determine a device spatial location after determining that a device geolocation does not satisfy one or more outdoor positioning criteria (e.g. an estimated device geolocation does not satisfy an accuracy threshold, precision threshold, confidence threshold, and the like).

The computer system 107 may receive device state data via wireless signals from the weapon-tracking device 101, store the device state data in a database, perform computations based on the device state data, and send messages or calls based on the device state data. For example, the computer system 107 may include a data server to receive device state data from the weapon-tracking device 101 and store the data in the data server in a database such as a SQL database (e.g. PostGres MySQL™) or a noSQL database (e.g. MongoDB™, Redis™. And the like). In some embodiments, the computer system 107 may receive wireless signals from the weapon-tracking device 101 that include a set of timestamped locations. In response, the computer system 107 may store the locations and their associated timestamps in a database 134. In addition, the computer system 107 may perform calculations or other operations based on the received device state data. For example, the computer system 107 may determine a geotagged geolocation associated with the device geolocation and include the geotagged geolocation name in a message to be sent to a client device 110.

In some embodiments, the computer system 107 may the message via a wireless signal to the client device 110, where the client device 110 may be a mobile computing device, a desktop computer, a landline phone, another computer system, and the like. For example, the computer system 107 may send a message to the client device 110 indicating a position of the weapon-tracking device 101 and any associated alert messages. Alternatively, or in addition, the computer system 107 may call the client device 110 via a cellular signal. For example, the computer system 107 may automatically call the client device 110, where a user answering the call on the client device 110 may receive an automated message that the weapon 102 may have been moved, used, or otherwise manipulated.

Figure 2:
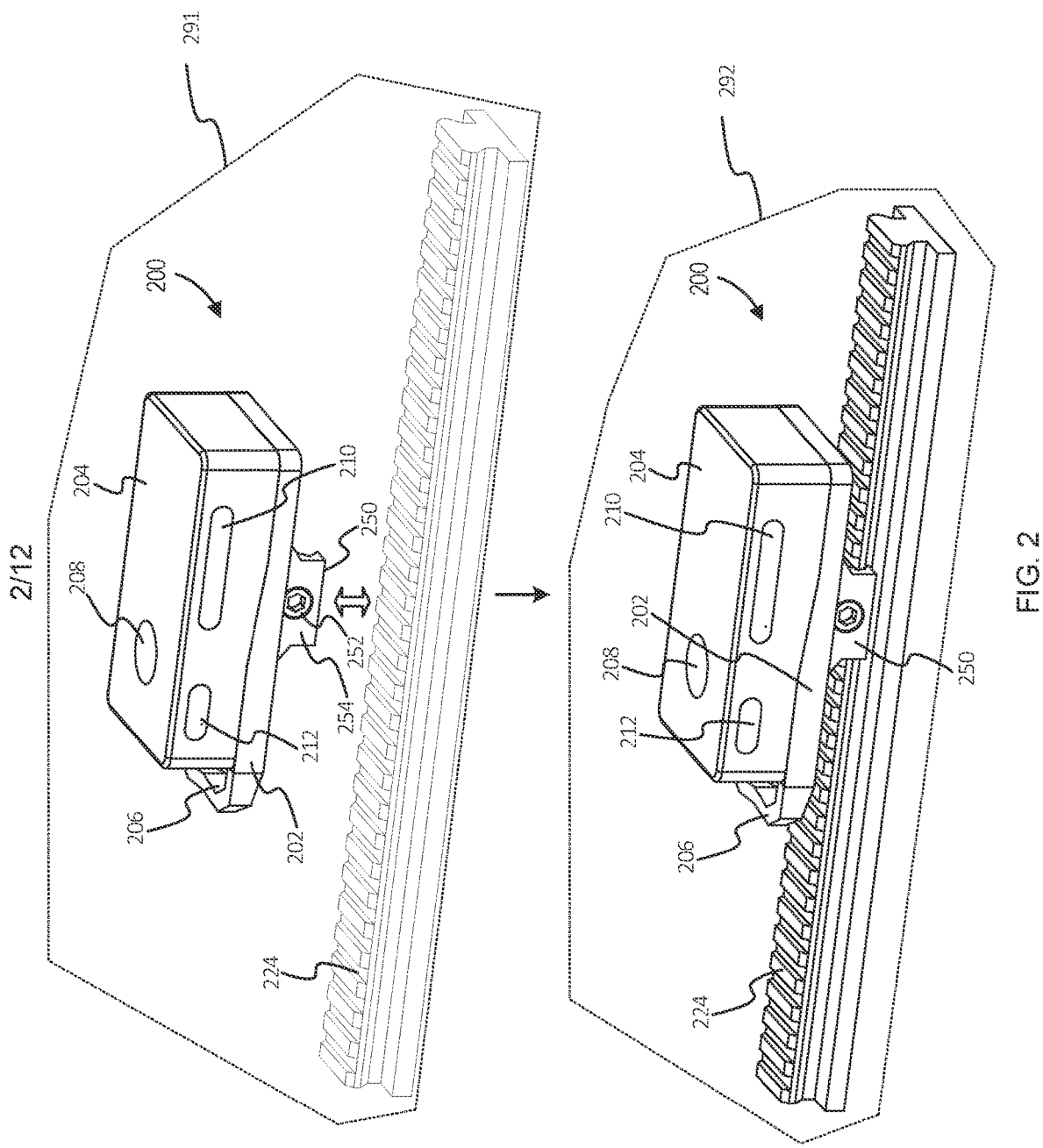
FIG. 2 includes a first perspective view of a weapon-tracking device detached from a rail and a second perspective view of the weapon-tracking device attached to the rail, in accordance with some embodiments.

FIG. 2 includes a first perspective view of a weapon-tracking device detached from a rail and a second perspective view of the weapon-tracking device attached to the rail, in accordance with some embodiments. The dashed region 291 shows a perspective view of a weapon-tracking device 200 detached from rail 224. The dashed region 292 shows a perspective view of a weapon-tracking device 200 attached to the rail 224. The weapon-tracking device 200 includes a housing 204, where the housing 204 may enclose an electronics assembly and other components of the weapon-tracking device 200. FIG. 2 shows the housing 204 as a rectangular prism with beveled corners and edges, but other housings of weapon-tracking devices may have other dimensions or shapes. For example, the housing may be shaped in the form of a triangular prism, sphere, hemisphere, and the like. The electronics assembly may include various electronics assembly such as one or more processors, circuitry, memory, chargers, batteries, and the like. The housing 204 may be constructed from or otherwise include one or more materials, such as iron, steel, aluminum, plastic, metal oxides, carbides, ceramics, and the like.

The weapon-tracking device 200 may include a base 202 that is at one side of the housing 204, where the base 202 may be coupled to housing 204 to further enclose the electronics assembly with the housing 204. Furthermore, the base 202 may include an integral slot 206 which is adapted to receive a gun sling. To account for common gun sling dimensions, the integral slot 206 may have a hole or semi-enclosed area having a bounded area of at least 1.5 centimeters. In some embodiments, the housing 204 may include materials having minimal interference with wireless signal transmission to and from the electronics assembly of the weapon-tracking device 200, where minimal interference may include a less than 20% loss in wireless signal strength. In some embodiments, the base 202 may include a material different from any materials in the rest of the housing 204.

The base 202 may be coupled to or otherwise attached to a clamp 250 wherein the clamp 250 includes a fastener 252 and a set of jaws 254. As further described below, the fastener 252 may be turned to increase or decrease a gap between the set of jaws 254. As shown in a comparison between the set of jaws 254 in the dashed region 291 and the set of jaws 254 in the dashed region 292, the gap between the set of jaws 254 may be increased or decreased by turning the fastener 252. The gap may be increased to allow the rails 224 to fit into the gap. Once the rails 224 are in the gap between the set of jaws 254, the set of jaws 254 may then be tightened by the fastener 252 to fix or otherwise attach the set of jaws 254 to the rails 224, the clamp 250 as a whole may be fixed or otherwise attached to the rails 224. In some embodiments, the physical force experienced by the clamp 250 may then be transferred to the base 202 and housing 204. In some embodiments, the clamp 250 may be shaped to engage the rails 224 to inhibit sliding along the rails 224 after engagement. For example, the clamp 250 may include one or more grooves or teeth that operably engage with the rails 224 to inhibit sliding along the rails 224.

The weapon-tracking device 200 may include one or more components directed to charging or otherwise powering the weapon-tracking device 200. For example, the port 212 may be a micro Universal Serial Bus (USB) port that facilitates the charging of a battery inside of the housing 204 and may also facilitate data exchange between weapon-tracking device 200 and an external device (e.g. computer). Alternatively, or in addition, the weapon-tracking device 200 may be equipped with wireless charging components such as one or more induction coils disposed within housing 204. The induction coils may be energized by an external wireless power source that is disposed at a position within a rack to allow for the external charge to charge a battery of the weapon-tracking device 200 that has an electrical connection with the induction coil while the weapon-tracking device 200 is attached to a weapon. An external power source may be a field power source, where a field power source may be an external power source that is mounted in a mobile apparatus such as a police vehicle, military vehicle, and the like. An external power source may include vehicle batteries, solar charging systems, and the like. In addition, other weapon-tracking devices may include a solar charger that charges a battery of the weapon-tracking device 200. For example, a weapon-tracking device may include a solar charger that has an electrical connection with a battery and charges the battery in the weapon-tracking device. Furthermore, as further described below, the weapon-tracking device 200 may be turned on or off with a power switch.

In some embodiments, the weapon-tracking device 200 may store data in a memory of the weapon-tracking device 200. For example, the weapon-tracking device 200 may store data in a solid-state drive inside of the housing 204. Alternatively, or in addition, the weapon-tracking device 200 may store data in a memory card inside of the memory card storage slot 210. For example, the memory card storage slot 210 may be an SD card slot and the weapon-tracking device 200 may store data onto a memory card inside of the memory card storage slot 210 via electrical leads that couple the memory card storage slot 210 to a processor of the weapon-tracking device 200. Alternatively, or in addition, some embodiments may send, via wireless signals or a wired connection, and retrieve data from a device or a data server. For example, some embodiments may send data to a mobile computing device such as a cellular phone via a wireless signal such as a WiFi connection.

Some embodiments may receive and transmit information using various types of wireless signals. Wireless signals may include radio frequency identification (RFID) signals such as near field communication (NFC) signals, Bluetooth signals, WiFi signals, cellular signals, ultra-wide band (UWB) signals, and the like. In some embodiments, the weapon-tracking device 200 may receive wireless signals comprising biometric information, position information, or other information from other electronic devices. For example, the weapon-tracking device 200 may receive device input data via a wireless signal from a second electronic device. In some embodiments, the weapon-tracking device 200 or a second electronic device may further use certain wireless signals such as UWB signals to sense an indoor spatial position, which may also be stored in or transmitted to the weapon-tracking device 200. The weapon-tracking device 200 may then send device state data to a remote computer system, where the device state data may include the indoor spatial position, a device identifier, and a time at which the indoor spatial position was determined.

The weapon-tracking device 200 may include a set of sensors to acquire sensor readings which may be a part of the device state data to be stored in a memory, be used to initiate additional operations, or be sent to a computer system via a wireless signal. The set of sensors may include one or more microphones, cameras, optical sensors, gyroscopes, accelerometers or other motion sensors, charge detectors, and the like. In some embodiments, one or more of the set of sensors may be sensitive to a use of the weapon, where a sensor that is sensitive to weapon use may show sensor readings that are different when a weapon is used in comparison to when the weapon is not being used. For example, an optical sensor may be used to detect an optical change associated with muzzle flashes or electrical bursts that may occur during weapon use, a microphone may be used to detect an acoustic change that may be associated with weapon use, or an accelerometer may be used to detect an acceleration change that may be a result of recoil from weapon use. Some embodiments may determine whether a set of sensor readings satisfy a change threshold, where satisfying the change threshold may result in an indication of weapon use corresponding to the set of sensor readings. In some embodiments, this indication, a time within the time duration during which one or more of the set of sensor readings were acquired, or other values related to a use of the weapon may be stored as part of the device state data of a device. In some embodiments, the sensor acquiring the one or more sensor readings used to determine whether a threshold is satisfied or whether a weapon is used may be identified with a sensor identifier, where the sensor identified may be stored as part of the device state data.

In some embodiments, the weapon-tracking device 200 may include a microphone which may acquire sounds in proximity to the weapon-tracking device 200. The acquired sounds may be stored as audio information in a memory of the weapon-tracking device 200. For example, the acquired sounds may be stored as an audio file or as part of a video file in a solid-state drive in the weapon-tracking device 200. Alternatively, or in addition, some embodiments may send audio data via wired connections or wireless signals to various computing devices such as mobile computing devices or to remote computer systems.

The weapon-tracking device 200 may include one or more accelerometers that may acquire sensor readings corresponding to when a weapon attached to the weapon-tracking device 200 is fired or otherwise used. For example, an accelerometer attached to the weapon-tracking device 200 may measure acceleration or acceleration changes over time, where the acquired sensor readings may then be processed, stored, or sent to other devices by the weapon-tracking device 200. For example, the weapon-tracking device 200 may measure acceleration and acceleration changes that are between 200 G (approximately 1960 meters per second squared) to 500 G (approximately 4900 meters per second squared) within 2 milliseconds. In some embodiments, the change threshold may be an acceleration change threshold over a period of time, wherein satisfying the acceleration change threshold indicates that a weapon attached to the weapon-tracking device 200 has been used. For example, in some embodiments, the acceleration change threshold may be satisfied if acceleration sensor readings show an acceleration change greater than 200 G within 2 milliseconds. Various types of accelerometers may be used to detect acceleration changes associated with weapon use, such as capacitive microelectronic mechanical systems, piezoresistive accelerometers, or piezoelectric accelerometers.

In some embodiments, an accelerometer, gyroscope, or other motion sensor may be used to acquire sensor readings of the motion of the weapon-tracking device. For example, sensor readings from an accelerometer or gyroscope of the weapon-tracking device 200 may be acquired and used to determine that a weapon attached to the weapon-tracking device 200 is being removed from a rack or drawn from a holster. In some embodiments, a processor in the weapon-tracking device 200 or a computer system may determine that the weapon-tracking device 200 has been displaced from a first geolocation based on a measured displacement, a measured velocity, or a measured acceleration.

In some embodiments, a processor in the weapon-tracking device 200 or a computer system may determine that the weapon-tracking device 200 has been used if a gyroscope acquires sensor readings that indicate a weapon barrel is within a range of angular orientations. For example, a processor in the weapon-tracking device 200 may determine that the weapon-tracking device 200 has been used if a gyroscope acquires angular orientation sensor readings that indicate that a weapon barrel is within +20 degrees to −20 degrees with respect to a plane that is perpendicular to Earth's gravity. In some embodiments, a determination that the weapon-tracking device 200 has been moved may result in the transmission of a wireless signal that includes device state data indicating that the weapon-tracking device 200 has been moved.

Weapon-tracking device 200 may also include an optical sensor to acquire optical sensor readings such as brightness, color sensor readings, and the like. The acquired sensor readings may be part of the device state data that is stored, processed, and transmitted by the weapon-tracking device 200. In some embodiments, the weapon-tracking device 200 may use the optical sensor to detect a sudden change in ambient light and sends a notification to a monitoring individual/owner. The optical sensor may include various types of photosensors such as photoelectric sensors, semiconductor sensors, photovoltaic sensors, and the like. For example, some embodiments may use a complementary metal-oxide-semiconductor (CMOS) sensor to measure luminosity.

Some embodiments may use changes in luminosity sensor readings to indicate activity in proximity to the weapon-tracking device to trigger the transmission of an alert message or other operations. Some embodiments determine whether a change in luminosity from a first value to a second value exceeds a luminosity change threshold. For example, some embodiments may determine that the luminosity change threshold is satisfied when the luminosity change threshold is greater than a change in luminosity associated with the luminosity difference between darkness and the luminosity associated with in daylight (e.g. 2,000 lux). In response, the weapon-tracking device 200 may transmit device state data via a wireless signal that indicates that a luminosity change threshold has been exceeded.

In some embodiments, the weapon-tracking device 200 may be part of a camera or include a camera system. For example, the weapon-tracking device 200 may include a camera system to acquire visual information such as a set of images or a video, where the set of images or video may be stored in a removable memory card, stored in a memory of the weapon-tracking device 200, or transmitted to the computer system 107. In some embodiments, the camera system may be activated based on other sensor readings. For example, the camera system may be activated and instructed to record video after a microphone is used to determine that a weapon has been used in the vicinity of the weapon-tracking device 200. The video and other acquired sensor readings may then be part of the device state data that is then sent to the computer system 107.

In some embodiments, the weapon-tracking device 200 may include a charge detector operable to detect when a charging state of the weapon-tracking device 200 changes. For example, the charge detector or the weapon-tracking device 200 may detect when the weapon-tracking device 200 is positioned in proximity to a wireless charging rack, removed from the wireless charging rack, plugged into a power source, or unplugged from the power source. In response to being disconnected from a power source, the weapon-tracking device 200 may then send device state data to a computing device, send a text message to a cellular phone, or initiate a call to a phone indicating that the weapon-tracking device 200 has been disconnected from the power source. For example, the weapon-tracking device 200 may transmit a text alert messages indicating that the weapon-tracking device 200 is no longer being charged at a wireless charging station to a mobile computing device.

In some embodiments, the weapon-tracking device 200 may transmit device state data to the computer system 107 when the weapon-tracking device 200 is disconnected from another device with which it may have been in physical, electrical, or signal contact. For example, the weapon-tracking device may transmit device state data based on a determination that the weapon-tracking device 200 has been disconnected from a rack. Alternatively, or in addition, the weapon-tracking device 200 may transmit device state data based on a determination that the weapon-tracking device 200 has been disconnected from a weapon to which it had been attached.

In some embodiments, the weapon-tracking device 200 may include a button 208, where the weapon-tracking device 200 is operative to receive a distress input when the button 208 is received. When a distress input is received, some embodiments may output a set of distress signals. In some embodiments, the set of distress signals may be an acoustic signal that may be perceptible to human hearing or sight. Alternatively, or in addition, the set of distress signals may be an acoustic or optical signal that is not perceptible to human hearing or sight, respectively. In some embodiments, the distress signal may be a wireless signal such as a cellular signal, SMS text message, a radio wave signal, a wireless internet signal, and the like. In some embodiments, device state data such as a device geolocation determined from GPS, GLONASS, or indoor positioning systems may be transmitted via the distress signal. In addition, or alternatively, the distress signal may include an indication of distress or that a distress button was pressed. For example, the device state data of a distress signal may include an indication that a distress input was received, where the device state data may be sent to a computing device that prompts the computing device to display a message stating, "WARNING: distress button pressed for device 1234 at position (0.00, 0.00)."

The weapon-tracking device 200 may be configured to accept custom device inputs and report the device inputs to a remote monitor via the communication capabilities of weapon-tracking device 200. This device input may include values transmitted to the weapon-tracking device 200 from other devices, such as mobile computing devices, biometric security devices, or smart bullets. In some embodiments, the weapon-tracking device 200 may transmit messages when a device input is absent. For example, after detecting a movement in an attached weapon, the weapon-tracking device 200 may determine whether a security input is being received in regular intervals from an authorized cellular phone. If the security input is not being received by the weapon-tracking device 200, the weapon-tracking device 200 may transmit a wireless signal to the computer system 107 or client device 110 indicating that the weapon-tracking device is being moved or used without receiving a security signal. Alternatively, or in addition, some embodiments may transmit messages when a device input is received. For example, in some embodiments, the weapon-tracking device 200 may receive a device input associated with a fingerprint or other biometric sensor reading from a biometric device. In response, the weapon-tracking device 200 may transmit a message associated with the fingerprint to the computer system 107, such as a fingerprint image or vector of values associated with the fingerprint.

In some embodiments, the weapon-tracking device 200 may be used as a silent observing device, where a silent observing device may acquire sounds, images, acceleration information, locations, or other sensor readings in proximity to the silent observing device without providing any visual indicators or sound that the silent observing device is acquiring sensor readings. In some embodiments, the weapon-tracking device 200 may be used as a silent observing device after being contacted by a pre-established set of sources. For example, the weapon-tracking device 200 may receive a cellular call from a cell number determined to be one of a pre-established set of sources and, in response, the weapon-tracking device 200 may answer the call to establish a cellular connection and transmit audio or data acquired by the microphone over the cellular connection, where the cellular connection may be a second wireless signal independent of other signals. In some embodiments, performing, storing, and transmitting acquired sensor readings with a silent observing device may provide advantages for covert operations and recovery missions.

In some embodiments, a remote server or phone call to the tracking device may activate a safety device that de-activates the weapon or otherwise inhibits using the weapon. For example, the weapon-tracking device 200 may be attached to a weapon and may receive a wireless signal instructing the safety device attached to the weapon to prevent use of the weapon. In response, the weapon-tracking device 200 may transmit the instructions to the safety feature, which may then prevent use of the weapon.

In some embodiments, the electronics assembly of the weapon-tracking device 200 may be disposed in or include other types of rail-mountable accessories including, but not limited to, a flashlight, a laser sight, a scope, a rifle handguard, a bipod, a frontal pistol grip, a camera, scope rings, an upper receiver, a lower receiver, and open sights. For example, the weapon-tracking device 200 may include a laser to act as a laser sight, where the laser may have an electrical connection with and is powered by the battery of the weapon-tracking device 200. In some embodiments, the weapon-tracking device 200 may act as a silent observing device while providing other functionality. For example, the weapon-tracking device may include a flashlight or laser sight that may be activated while the weapon-tracking device acts as a silent observing device. In some embodiments, allowing for use of some of an accessory's functionality may reduce the likelihood that the weapon-tracking device would be removed from an attached weapon.

Figure 3:
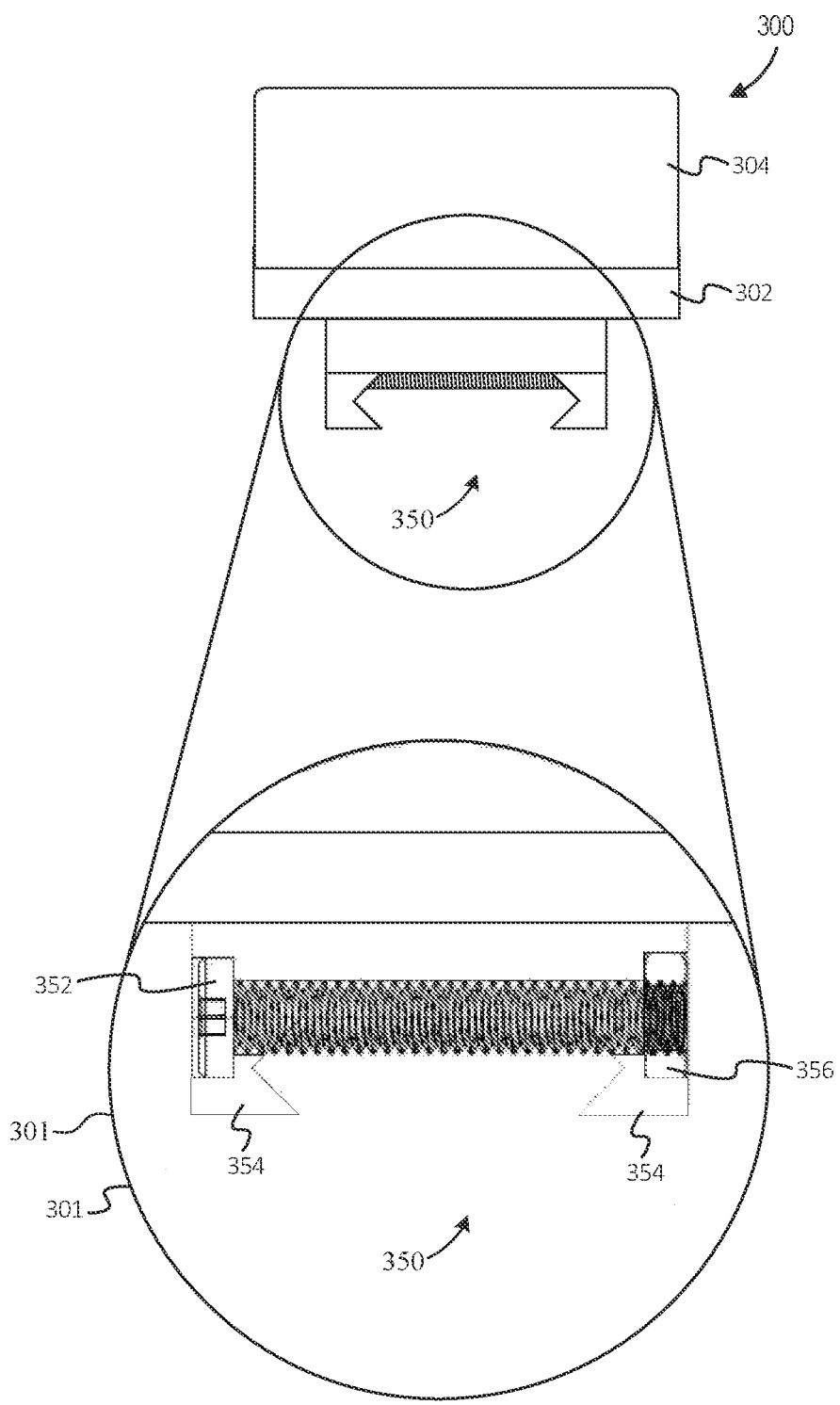
FIG. 3 is a rear elevation view of a weapon-tracking device, in accordance with some embodiments.

FIG. 3 is a rear view of a weapon-tracking device, in accordance with some embodiments. FIG. 3 shows the rear view of a weapon-tracking device 300 and a close-up window 301 of clamp 350. The clamp 350 includes a set of opposing jaws 354 configured to urge toward one another when a fastener 352 is tightened into a nut 356. In some embodiments, a rail may be disposed between the set of opposing jaws 354, which may causes the set of opposing jaws 354 to engage the rail and thus fix the weapon-tracking device 300 to the rail. In some embodiments, the fastener 352 may be a hex machine screw. Alternatively, the fastener 352 may include types of fasteners such as flathead screws, phillips-head screws, tamper-resistant screws, security screws, and the like.

Figure 4:
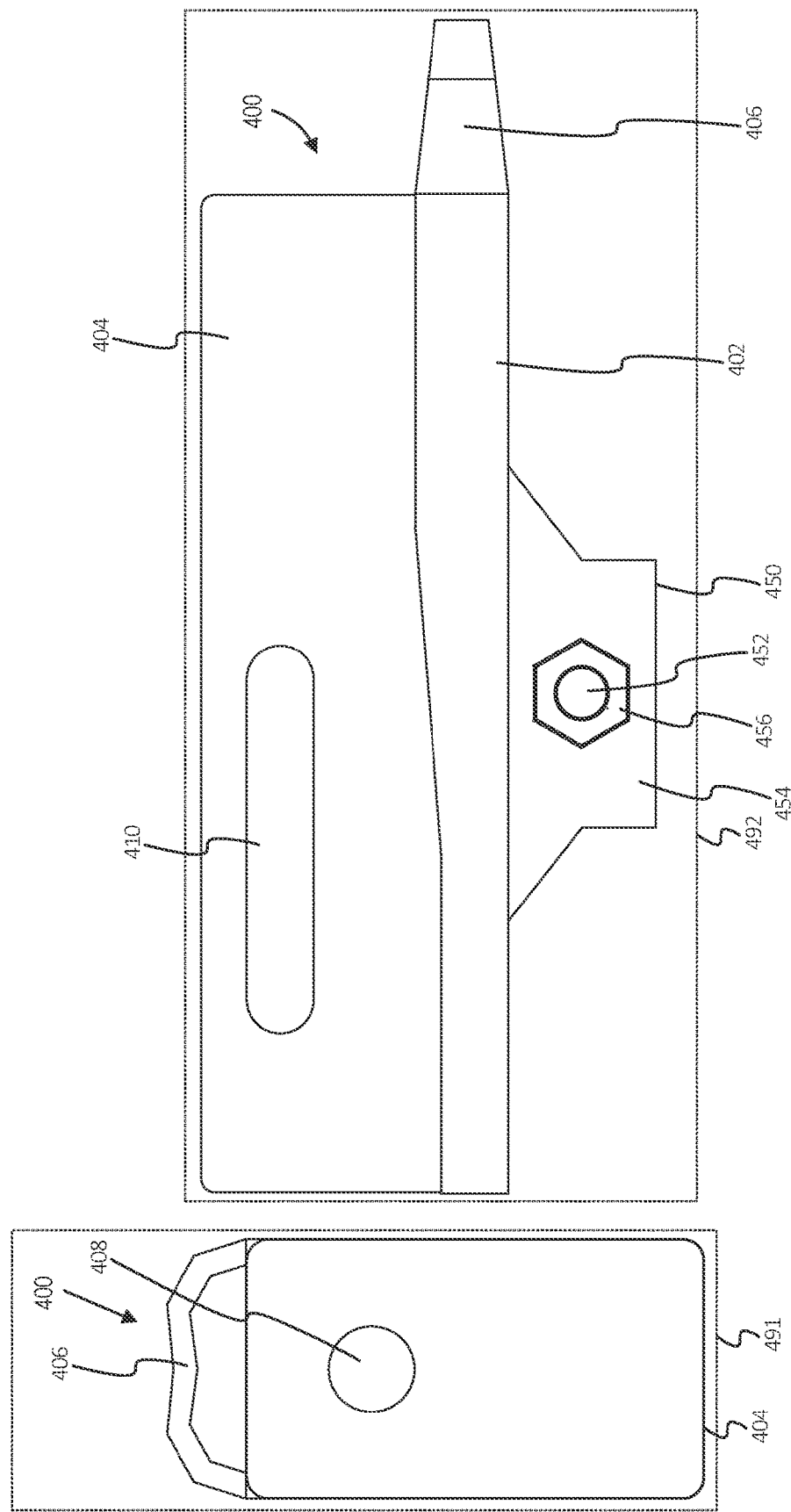
FIG. 4 is a plan view and an elevation view of a weapon-tracking device, in accordance with some embodiments.

FIG. 4 shows a top view and a side view of a weapon-tracking device 400. The top view box 491 includes a top view of the weapon-tracking device 400. The top view box 491 shows a housing 404 the weapon-tracking device 400 having a button 408 at its top. The button 408 may perform a function similar to or identical to the button 208. For example, pressing the button 408 may direct the weapon-tracking device 400 to transmit a distress signal. An integral slot 406 may be attached to the housing 404, where a gun sling may be fitted through the integral slot 406.

The side view box 492 includes a side view of the weapon-tracking device 400. The side view box 492 shows the base 402 attached to the housing 404 of the weapon-tracking device 400. The clamp 450 is shown attached to the base 402, where the clamp 450 comprises a fastener 452, where the fastener couples a portions of a set of jaws 454 and is threaded through a nut 456.

Figure 5:
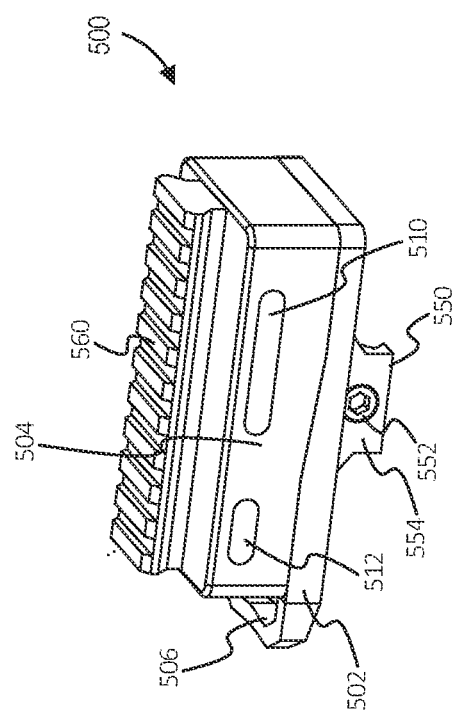
FIG. 5 is a perspective view of a weapon-tracking device that includes an integral rail segment, in accordance with some embodiments.

FIG. 5 is a perspective view of a weapon-tracking device that includes an integral rail segment, in accordance with some embodiments. The weapon-tracking device 500 includes a housing 504, where the housing 504 may enclose an electronics assembly and other components of the weapon-tracking device 500. The weapon-tracking device 500 may include a base 502 that is at a bottom end of the housing 504, where the base 502 may be coupled to the housing 504 to further enclose the electronics assembly with the housing 504. Furthermore, the base 502 may include an integral slot 506 similar to or identical to the integral slot 206 described above. The base 502 may be attached to a clamp 550 wherein the clamp 550 includes a fastener 552 and a set of jaws 554, where the fastener 552 and the set of jaws 554 may be similar or identical to the fastener 252 and the set of jaws 254 described above.

The weapon-tracking device 500 also includes an integral rail segment 560 at the top of the housing 504. In some embodiments, the integral rail segment 560 may include a rail type similar a rail type of a rail disposed between the set of jaws 554, wherein teeth of the integral rail segment 560 may protrude outward or otherwise partially away from a center of the weapon-tracking device 500. Alternatively, or in addition, the integral rail segment 560 may include a rail pattern different from any rail pattern of any rails disposed between the set of jaws 554. While the weapon-tracking devices are described above as having clamps attachable to rails, other weapon-tracking devices may include clamps or other coupling assemblies that may be mounted on any other type of general-purpose mounting structure. Furthermore, while some weapon-tracking devices may be mounted on bottom rails of a weapon, other weapon-tracking devices may be mounted at other positions of a weapon, such as a top or side of a weapon. In some embodiments, the integral rail segment 560 may be an integral part of the housing 504. In some embodiments, the integral rail segment 560 may be permanently attached by an adhesive or a weld to the housing 504. In some embodiments, the integral rail segment 560 may be removably attached to housing 504 by removable fasteners such as screws, bolts, and the like.

Figure 6:
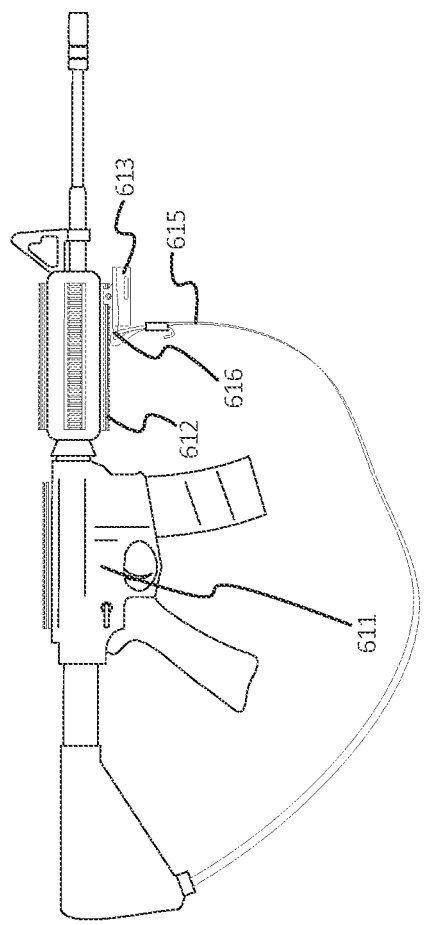
FIG. 6 is a side elevation view of a weapon-tracking device attached to a bottom of a weapon, in accordance with some embodiments.

FIG. 6 is a side elevation view of a weapon-tracking device attached to a bottom of a weapon, in accordance with some embodiments. FIG. 6 shows a weapon 611 that includes weapon rails 612 at the bottom of the weapon 611. A weapon-tracking device 613 is fixed to the weapon rails 612 and is thus fixed to the weapon 611. A gun sling 615 is shown looping through the slot 616.

Figure 7:
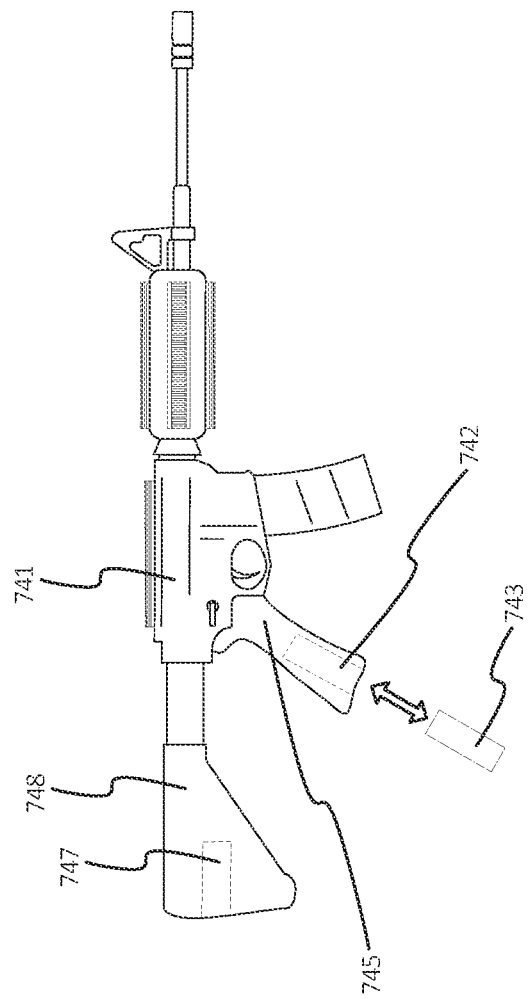
FIG. 7 is a side elevation view of a weapon-tracking device attached to a handle of a weapon, in accordance with some embodiments.

FIG. 7 is a side elevation view of a weapon-tracking device attached to a handle of a weapon, in accordance with some embodiments. FIG. 7 shows a weapon 741 that includes a cavity 742 within a handle 745 of the weapon 741. A weapon-tracking device 743 may be inserted into the cavity 742. Alternatively, the weapon-tracking device 743 may be inserted into a cavity 747, where the cavity 747 may be in a buttstock 748 of the weapon 741.

Figure 8:
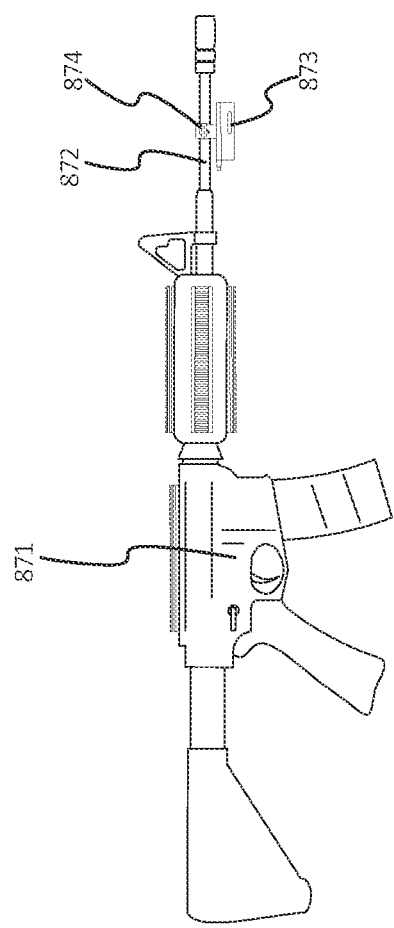
FIG. 8 is a side elevation view of a weapon-tracking device attached to a barrel of a weapon, in accordance with some embodiments.

FIG. 8 is a side elevation view of a weapon-tracking device attached to a barrel of a weapon, in accordance with some embodiments. FIG. 8 shows a weapon 871 that includes gun barrel 872 at an end of the weapon 871. A weapon-tracking device 873 may be fixed to the gun barrel 872 via a clamp 874. In some embodiments, the clamp 874 may be formed from or otherwise include a heat resistant material capable of withstanding the heat from the gun barrel 872. For example, if the expected maximum temperature of the gun barrel is 200 degrees Celsius, the clamp 874 may include a ceramic or metal that does not deform or warp at a temperature lower than 200 degrees Celsius.

Figure 9:
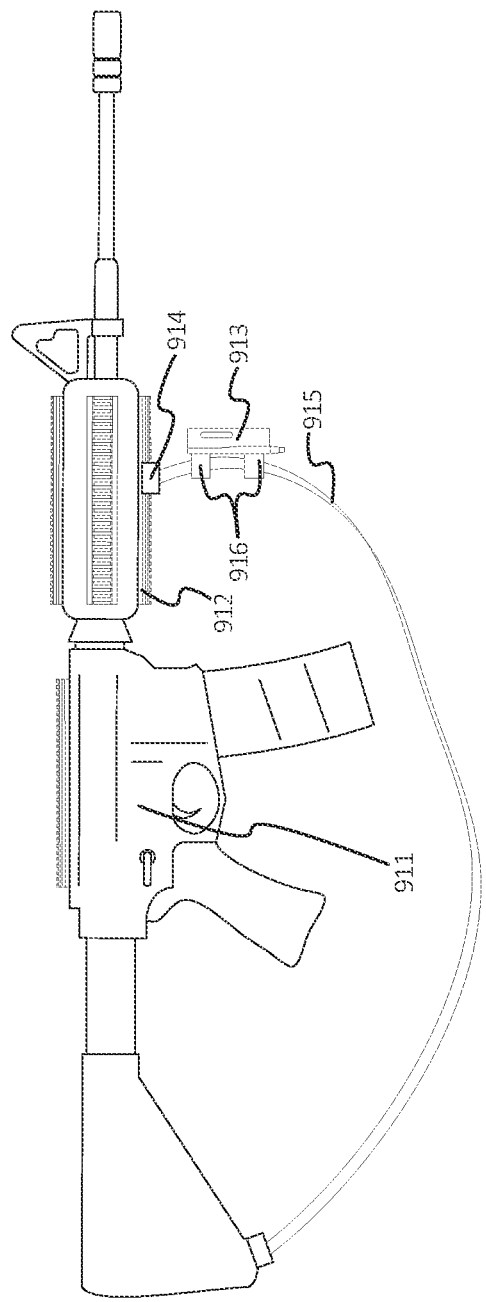
FIG. 9 is a side elevation view of a weapon-tracking device attached to a gun sling of a weapon, in accordance with some embodiments.

FIG. 9 is a side elevation view of a weapon-tracking device attached to a gun sling of a weapon, in accordance with some embodiments. FIG. 9 shows a weapon 911 that includes weapon rails 912 at the bottom of the weapon 911. A gun sling anchor 914 is shown securing a gun sling 915 to the weapon rails 912. The gun sling 915 is shown looping through a weapon-tracking device 913 via a slot assembly 916 that is attached to the weapon-tracking device 913.

Figure 10:
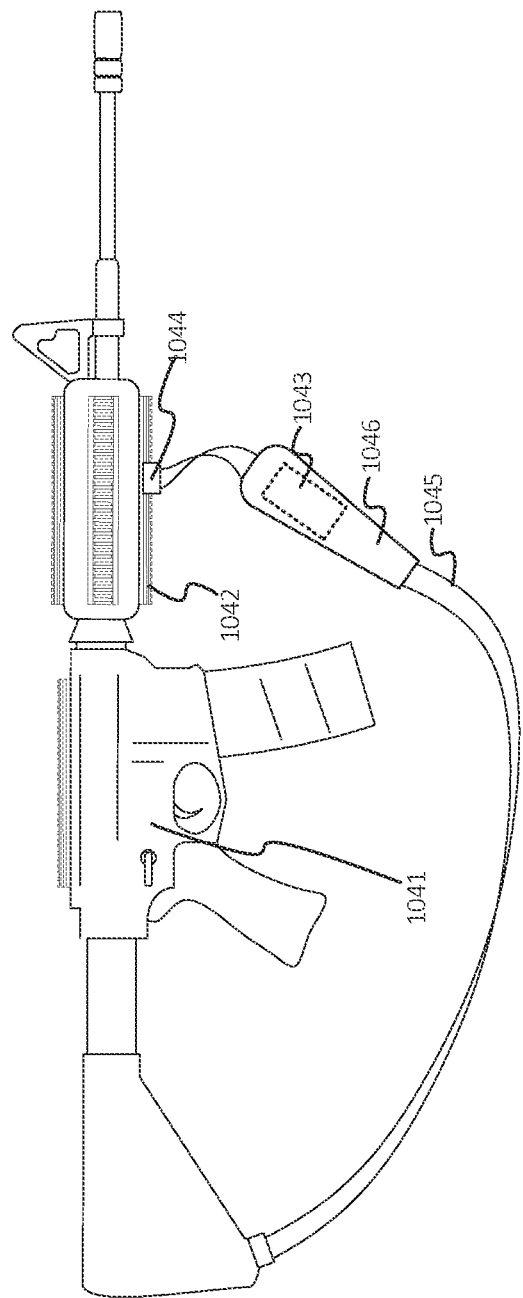
FIG. 10 is a side elevation view of a weapon-tracking device attached to a sling pad of a weapon, in accordance with some embodiments

FIG. 10 is a side elevation view of a weapon-tracking device attached to a sling pad of a weapon, in accordance with some embodiments. FIG. 10 shows a weapon 1041 that includes weapon rails 1042 at the bottom of the weapon 1041. A gun sling anchor 1044 is shown securing a gun sling 1045 to the weapon rails 1042. The weapon-tracking device 1043 is embedded in an integral portion of a sling pad 1046 of the gun sling 1045. In some embodiments, the weapon-tracking device 1043 or a portion of the weapon-tracking device 1043 such as an electronics assembly of the weapon-tracking device 1043 may be encapsulated in epoxy, resin, polyurethane, or any combination of such materials to protect the electronics against moisture, physical damage, and the like.

Figure 11:
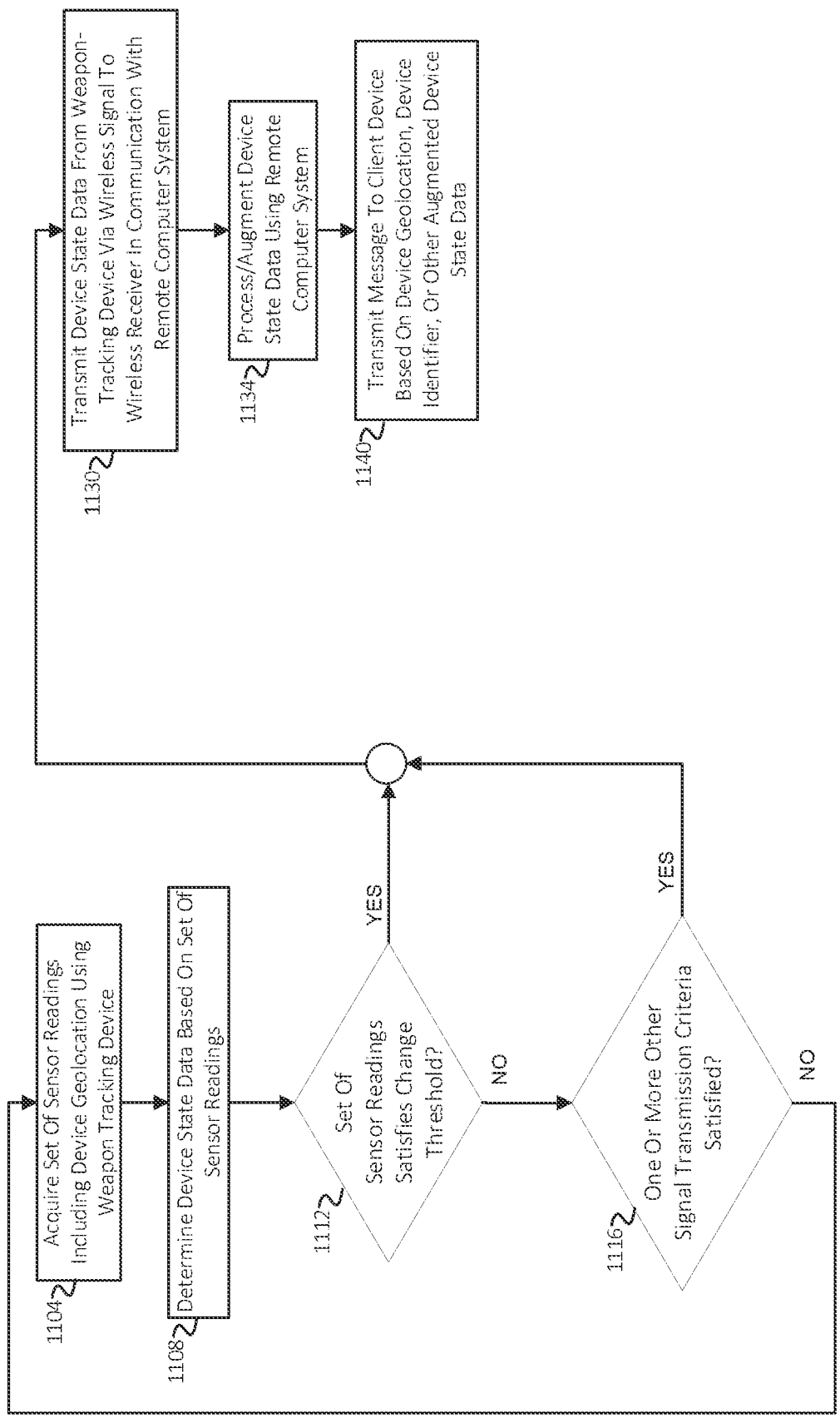
FIG. 11 is a flowchart of operations to use a weapon-tracking system to determine a weapon geolocation, in accordance with some embodiments.

FIG. 11 is a flowchart of operations to use a weapon-tracking system to determine a weapon geolocation, in accordance with some embodiments. In some embodiments, the process 1100 of FIG. 11, like the other processes and functionality described herein, may be implemented as computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 1100 includes acquiring a set of sensor readings including device geolocation using the weapon-tracking device, as indicated by block 1104. The set of sensor readings can be acquired using any of a set of sensors such as one or more GPS sensors, indoor positioning sensors, microphones, cameras, optical sensors, gyroscopes, accelerometers or other motion sensors, charge detectors, biometric sensors, and the like. The set of sensor readings may include optical sensor readings, acceleration sensor readings, velocity sensor readings, displacement sensor readings, angular orientation sensor readings, angular velocity sensor readings, outdoor locations, indoor geolocations, acoustic sensor readings, biometric sensor readings, and the like. In addition, the one or more cameras or microphones may be used to acquire images, audio, or videos.

In some embodiments, the set of sensor readings may include a device geolocation. The device geolocation may be determined based on a set satellite signals such as GPS signals or GLONASS signals received by one or more antennas in a weapon-tracking device. Alternatively, or in addition, the device geolocation may be based on indoor positioning devices. In some embodiments, both an outdoor geolocation and indoor geolocation may be provided, where an indoor geolocation may provide a granularity in location detail not available for an outdoor geolocation. For example, device geolocation may include both an outdoor geolocation and indoor geolocation, where the outdoor geolocation is represented by a latitude and longitude position having a 100-meter radius of uncertainty, and the indoor geolocation is represented by an aisle or sector of a shopping center.

In some embodiments, the process 1100 includes determining a device state data based on the set of sensor readings, as indicated by block 1108. The device state data may include sensor readings directly acquired from the set of sensors. In some embodiments, the device state data may include sensor readings received by a processor of a weapon-tracking device that were acquired by a sensor sensitive to weapon use. For example, the device state data may include acceleration sensor readings received by the processor of the weapon-tracking device acquired by an accelerometer in the weapon-tracking device. The device state data may also include processed values. For example, based on a set of acceleration values, some embodiments may calculate velocity and displacement values and add the calculated velocity and displacement values to the device state data. In some cases, a counter in memory of the weapon-tracking device may be incremented each time firing is detected, and the count may be reported along with geolocations to a remote server.

In some embodiments, the process 1100 includes determining whether a change in the sensor readings satisfy a change threshold, as indicated by block 1112. In some embodiments, a change threshold may be an absolute difference or relative difference over a preset duration of time. For example, a change threshold may be an acceleration change threshold, where the acceleration change threshold may be satisfied based on a determination that the magnitude of acceleration sensor readings changes over 2 milliseconds is greater than 200 G. Alternatively, a change threshold may be based on being greater than or less than than a preset value without a time constraint. For example, a change threshold may be a luminosity change threshold, where the change threshold may be satisfied by determining that a sensor reading equal to 3000 lux exceeds a luminosity change threshold equal to 2000 lux. As another example, a change threshold may be an acoustic change threshold, where the change threshold may be satisfied by determining that an acoustic sensor reading exceeds an acoustic change threshold such as 100 decibels, 120 decibels, 130 decibels, 140 decibels, or the like. As further discussed below, in some embodiments, a change threshold may be a signal transmission criterion, and satisfying the change threshold may result in sending device state data to a remote computer system via a wireless signal. If the change in sensor readings satisfies the change threshold, operations of the process 1100 may proceed to block 1130. Otherwise, operations of the process 1100 may proceed to block 1116.

In some embodiments, the process 1100 includes determining whether one or more other signal transmission criteria are satisfied, as indicated by block 1116. In some embodiments, a signal transmission criterion may be satisfied if a physical or virtual button, switch, or other user interface element is activated. For example, a signal transmission criterion may be satisfied for some embodiments when a button is pressed. Alternatively, or in addition, a signal transmission criterion may be satisfied when a wireless signal instructing the weapon-tracking device to transmit data is received. For example, a signal criterion may be satisfied when the weapon-tracking device receives a secured message paired with a hashed security code to transmit data. Alternatively, or in addition, the signal transmission criterion may be satisfied if a call from a predetermined number is provided. For example, a signal transmission criterion may be satisfied if a call from one of a predetermined set of numbers is received by the weapon-tracking device. If one or more other signal transmission criteria are satisfied, operations of the process 1100 may proceed to block 1130. Otherwise, operations of the process 1100 may return to block 1104.

In some embodiments, the process 1100 includes transmitting device state data from the weapon-tracking device via a wireless signal to a wireless receiver, as indicated by block 1130. In some embodiments, the device state data to be transmitted may include the device geolocation and a tracking device identifier associated with the weapon-tracking device. In some embodiments, the device state data may be transmitted to and stored in a data server of a remote computer system in communication with the wireless signal receiver.

In some embodiments, the process 1100 may include processing or otherwise augmenting the device state data using the remote computer system, as indicated by block 1134. Processing or otherwise augmenting the device state data may include determining a street address, city, state, or country based on the device geolocation and adding this information to the augmented device state data to be transmitted to a client device. In addition, some embodiments may determine a time of weapon use (e.g. weapon firing) based on the device state data. For example, after receiving a set of sensor readings in the device state data and their corresponding times, some embodiments may approximate an exact time of weapon use by averaging a set of time values. Furthermore, some embodiments may apply machine-learning image recognition methods such as facial recognition methods or text recognition methods to determine whether any recognized faces. Some embodiments may then include names associated with the recognized faces in the augmented device state data. In some embodiments, the device state data being processed by the remote computer system may include values that are not sent as part of the augmented device state data sent to a client device. Alternatively, or in addition, the augmented device state data may include values that were not transmitted by the weapon-tracking device.

In some embodiments, the process 1100 may include transmitting a message to a client device based on a device geolocation, tracking device identifier, or other augmented device state data, as indicated by block 1140. In some embodiments, the message may be transmitted as a text message or as an e-mail. Alternatively, or in addition, the message may be transmitted as an automated audio message over a cellular connection, landline connection, or internet connection. Alternatively, or in addition, the message may be transmitted via an API of the client device.

In some embodiments, the message may include the device identifier associated with the weapon-tracking device. In addition, or alternatively, the message may include a device geolocation in the form a latitude and longitude coordinate, a postal address (e.g. information including a street address, a city, and a state), a map with a pin marking a geolocation, and the like. In addition, or alternatively, the message may include a time associated with the acquisition of the device geolocation. In addition, or alternatively, the message may include a weapon use time, such as a weapon firing time. In addition, or alternatively, the message may include an indicator of one or more sensors used to acquire the sensor readings that triggered transmission of a wireless signal. For example, the message may include a first text element "gun fired" indicating the use of a weapon attached to a weapon-tracking device, a second text element "13:15 Jan. 1, 2025" indicating a time associated with the weapon use, a third text element "123 FictionalNameStreet, FictionalTownName, FictionalStateName" indicating a device geolocation associated with the weapon use, and "accelerometer" indicating that sensor readings from an accelerometer of the weapon-tracking device were used In some embodiments, the text element "accelerometer" may be a sensor identifier or be based on a sensor identifier that is part of the device state data associated with this example. In some embodiments, an alert message may be sent from the weapon-tracking device in response to the sensor identifier or based on the sensor identifier. Once transmitted, the client device may directly display the message on an electronic screen, process the message for further operations, or store the message in memory.

In some embodiments, the weapon-tracking devices above may form an ad-hoc network (e.g., an ad-hoc mesh network), e.g., a Zigbee™, Wifi™, or Bluetooth™ network, and geolocations sensed by one device may be shared by that device with others via the network. For instance, devices may periodically transmit a beacon with their geolocation, and other devices may receive those beacons, update an inventory of unique identifiers of other weapon-tracking devices in wireless range stored in memory. The inventory may indicate a timestamp of the beacon last received. In some cases, a weapon-tracking device without a GPS or cellular signal may rely instead on geolocations received in these beacons, e.g., a weapon-tracking device inside a building may rely on the geolocation reported by another weapon-tracking device outside the building. In some cases, beaconed geolocations may be associated with a value indicative of a quality or expected error of the geolocation (e.g., cellular signal triangulation may be less accurate than GPS-determined locations, and some GPS-based locations may be more accurate than others depending on the number of satellites with a line-of-sight signal. In some cases, when reporting a weapons geolocation to a remote server, the inventory or aspects thereof may be sent as well.

In some cases, the weapon-tracking devices above may be operative to receive a wireless signal (e.g., from one of the above remote servers) instructing them to emit a sound, like a beeping sound through a speaker of the device, to assist a user with finding the weapon when lost.

In some cases, the weapon-tracking device may be operative to disable the weapon responsive to the device's geolocation. For instance, some embodiments may drive a solenoid to engage a lock (e.g., drive a pin into) a firing pin of the weapon, or some embodiments may open a circuit by which electronic weapons, like stun guns, are fired. In some cases, the weapon-tracking device may be configured to disable the weapon in response to determining the weapon is within a geofence (like a point with a radius, or one defined by a bounding polygon). In some cases, the weapon-tracking device may be configured to enable the weapon in response to determining the weapon is within a geofence. In some cases, the weapon-tracking device may be operative to disable the weapon when the weapon is pointed at another weapon-tracking device (e.g., within a 1 degree angular cone). For instance, the weapon tracking devices may be configured with an infrared LED that blinks at a particular frequency, or two LEDs that each blink at different frequencies and have different wavelengths. An optical sensor oriented facing in a direction of fire of the weapon (like a sensor recessed in a thin, elongated tube to control the angular sensitivity) may emit a signal that indicates whether the infrared light patterns emitted by another weapon tracking device is sensed, and the processor may selectively disable or enable firing in response. In some cases, the weapon-tracking device may include buttons or other interfaces to selectively manually disable or enable these firing control features.

Figure 12:
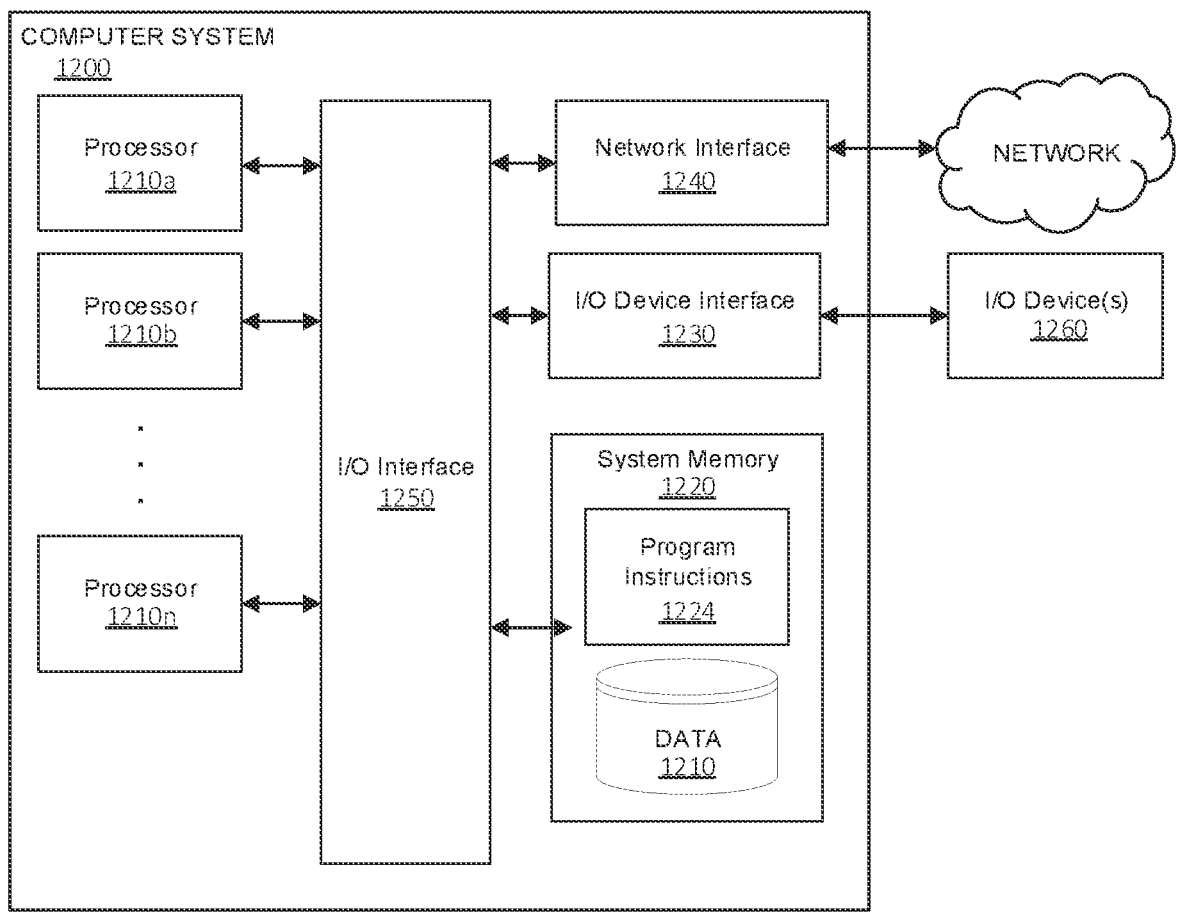
FIG. 12 shows an example of a computing device by which the present techniques may be implemented.

FIG. 12 shows an example of a computer system by which the present techniques may be implemented in accordance with some embodiments. Various portions of systems and methods described herein, may include or be executed on one or more computer systems similar to computer system 1200. Further, processes and modules described herein may be executed by one or more processing systems similar to that of computer system 1200.

Computer system 1200 may include one or more processors (e.g., processors 1210a-1210n) coupled to System memory 1220, an input/output I/O device interface 1230, and a network interface 1240 via an input/output (I/O) interface 1250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 1220). Computer system 1200 may be a uni-processor system including one processor (e.g., processor 1210a), or a multi-processor system including any number of suitable processors (e.g., 1210a-1210n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1200 may include a plurality of computing devices (e.g., distributed computer systems) to implement various processing functions.

I/O device interface 1230 may provide an interface for connection of one or more I/O devices 1260 to computer system 1200. I/O devices may include devices that receive input (e.g., from a user) or output information (e.g., to a user). I/O devices 1260 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1260 may be connected to computer system 1200 through a wired or wireless connection. I/O devices 1260 may be connected to computer system 1200 from a remote location. I/O devices 1260 located on remote computer system, for example, may be connected to computer system 1200 via a network and network interface 1240.

Network interface 1240 may include a network adapter that provides for connection of computer system 1200 to a network. Network interface may 1240 may facilitate data exchange between computer system 1200 and other devices connected to the network. Network interface 1240 may support wired or wireless communication. The network may include an electronic communication network, such as the Internet, a local area network (LAN), a wide area network (WAN), a cellular communications network, or the like.

System memory 1220 may be configured to store program instructions 1224 or data 1210. Program instructions 1224 may be executable by a processor (e.g., one or more of processors 1210a-1210n) to implement one or more embodiments of the present techniques. Program instructions 1224 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1220 may include a non-transitory computer readable storage medium that may have program instructions stored thereon that are executable by a computer processor (e.g., one or more of processors 1210a-1210n) to cause the subject matter and the functional operations described herein. A memory (e.g., System memory 1220) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may be configured to coordinate I/O traffic between processors 1210a-1210n, System memory 1220, network interface 1240, I/O devices 1260, and/or other peripheral devices. I/O interface 1250 may perform protocol, timing, or other data transformations to convert data signals from one component (e.g., System memory 1220) into a format suitable for use by another component (e.g., processors 1210a-1210n). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1200 or multiple computer systems 1200 configured to host different portions or instances of embodiments. Multiple computer systems 1200 may provide for parallel or sequential processing/execution of one or more portions of the techniques described herein.

Those skilled in the art will appreciate that computer system 1200 is merely illustrative and is not intended to limit the scope of the techniques described herein. Computer system 1200 may include any combination of devices or software that may perform or otherwise provide for the performance of the techniques described herein. For example, computer system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. An apparatus, comprising: a non-transitory, machine-readable medium storing instructions that, when executed by a processor of a weapon-tracking device, effectuate operations: determining a geolocation of the weapon-tracking device attached to a weapon based on a wireless signal received by the weapon-tracking device; receiving, with the processor of the weapon-tracking device, a sensor reading using a sensor attached to the weapon-tracking device, wherein the sensor is sensitive to a use of the weapon; determining that a change in the sensor reading satisfies a change threshold; in response to a determination that the change threshold is satisfied, transmitting device state data to a wireless signal receiver via an other wireless signal, wherein the device state data comprises a device identifier and the device geolocation; storing the device identifier and the device geolocation in a data server that receives the device identifier and the device geolocation via the wireless signal receiver; and transmitting a message based on the device identifier and device geolocation to a client device, wherein the message indicates a time associated with the use of the weapon.

2. The apparatus of embodiment 1, wherein the other wireless signal further comprises a sensor identifier associated with the sensor reading, and wherein the operations further comprise transmitting an alert message to the client based on the sensor identifier.

3. The apparatus of any of embodiments 1 to 2, wherein the sensor is a microphone, and wherein the sensor reading is an acoustic sensor reading, and wherein determining whether the change threshold is satisfied comprises determining that the acoustic sensor reading is greater than an acoustic change threshold.

4. The apparatus of any of embodiments 1 to 3, wherein the sensor is an accelerometer, and wherein the sensor reading is an acceleration sensor reading, and wherein determining whether the change threshold is satisfied comprises determining that the acceleration sensor reading indicates a change in acceleration greater than 1960 meters per second squared within 2 milliseconds.

5. The apparatus of any of embodiments 1 to 4, wherein the sensor is an optical sensor, and wherein the sensor reading is an optical sensor reading, and wherein determining whether the change threshold is satisfied comprises determining that the optical sensor reading exceeds a luminosity change threshold.

6. The apparatus of any of embodiments 1 to 5, wherein the other wireless signal comprises audio acquired by a microphone attached to the weapon responsive to firing of the weapon.

7. The apparatus of embodiment 6, wherein the audio is acquired without the weapon-tracking device generating a visual indicator or sound indicating that the microphone is recording a sound.

8. The apparatus of any of embodiments 6 to 7, the operations further comprising: receiving, with the weapon-tracking device, an input indicative of distress; and augmenting the device state data to indicate that the input indicative of distress has been received.

9. The apparatus of any of embodiments 1 to 8, the operations further comprising acquiring a biometric sensor reading using a biometric sensor, wherein the device state data is based on the biometric sensor reading.

10. The apparatus of any of embodiments 1 to 9, wherein the sensor is a gyroscope, and wherein the sensor reading is an angular orientation relative to the Earth's gravity, and wherein determining whether the change threshold is satisfied comprises determining that the angular orientation indicates that a barrel of the weapon is being oriented at an angular orientation between +20 degrees and −20 degrees.

11. The apparatus of embodiment 10, the operations further comprising receiving device input data from an electronic device coupled to the weapon, wherein transmitting the device state data comprises transmitting the device state data based on the device input data.

12. The apparatus of any of embodiments 10 to 11, wherein: the device input data comprises a set of geolocations corresponding to an indoor geolocation; and transmitting the device state data comprises transmitting the set of geolocations.

13. The apparatus of any of embodiments 1 to 12, the apparatus further comprising: a housing in which the medium is disposed; a clamp attached to the housing, wherein the clamp comprises a first jaw, and wherein the clamp comprises a second jaw opposed to the first jaw; a fastener attached to the first jaw and the second jaw, wherein the fastener is coupled to a portion of the first jaw and a portion of the second jaw; a first antenna to generate satellite signal sensor readings based on satellite signals received from a set of satellites; a charger attached to the housing; a battery having an electrical connection with the charger; and a second antenna to transmit the wireless signal.

14. The apparatus of embodiment 13, the apparatus further comprising an induction coil, wherein the induction coil has an electrical connection with the battery.

15. The apparatus of any of embodiments 13 to 14, the apparatus further comprising a solar charger, wherein the solar charger has an electrical connection with the battery.

16. The apparatus of any of embodiments 13 to 15, the apparatus further comprising a rail segment that is attached to the housing, wherein the housing is disposed between the rail segment and the clamp, and wherein teeth in the rail segment protrude away from a center of the weapon-tracking device.

17. The apparatus of any of embodiments 13 to 16, the apparatus further comprising a laser, wherein the laser it attached to the housing, and wherein the laser is powered by the battery.

18. The apparatus of any of embodiments 1 to 17, the apparatus further comprising a memory card storage slot having electrical leads coupled to the processor.

19. The apparatus of any of embodiments 1 to 18, wherein the processor is encapsulated in epoxy, resin, or polyurethane.

20. The apparatus of any of embodiments 1 to 19, the apparatus further comprising a weapon having the processor and the medium.

21. A method comprising: determining a geolocation of a weapon-tracking device attached to a weapon based on a wireless signal received by the weapon-tracking device; receiving, with a processor of the weapon-tracking device, a sensor reading using a sensor attached to the weapon-tracking device, wherein the sensor is sensitive to a use of the weapon; determining that a change in the sensor reading satisfies a change threshold; in response to a determination that the change threshold is satisfied, transmitting device state data to a wireless signal receiver via an other wireless signal, wherein the device state data comprises a device identifier and the device geolocation; storing the device identifier and the device geolocation in a data server that receives the device identifier and the device geolocation via the wireless signal receiver; and transmitting a message based on the device identifier and device geolocation to a client device, wherein the message indicates a time associated with the use of the weapon.

What is claimed is:

1. A tangible, non-transitory, machine-readable medium storing instructions that when executed by one or more processors effectuate operations comprising:
determining, with one or more processors, an indoor geolocation of a weapon-tracker based on first location data received from a first sensor associated with the weapon-tracker, wherein the indoor geolocation includes an indoor position of a plurality of indoor positions of an indoor space;
receiving, with the one or more processors, weapon use data from a second sensor associated with the weapon-tracker, wherein the weapon-tracker is associated with a weapon;
determining, with the one or more processors, that a change in the weapon use data satisfies a change threshold, wherein the change indicates that the weapon has been operated; and
in response to a determination that the change threshold is satisfied, storing, with the one or more processors, the indoor geolocation and weapon-tracker state data that comprises a weapon-tracker identifier in a database.

2. The medium of claim 1, wherein the operations further comprise:
transmitting a message based on the weapon-tracker identifier and the indoor geolocation of the weapon-tracker to a client device, wherein the message indicates at least the indoor geolocation associated with the weapon-tracker.

3. The medium of claim 1, wherein the operations comprise steps of determining the indoor geolocation of the weapon-tracker.

4. The medium of claim 1, wherein the operations further comprise:
determining that the weapon-tracker is located within a geofence based on the indoor geolocation.

5. The medium of claim 4, wherein the operations further comprise:
in response to determining that the weapon-tracker is within the geofence, either:
disabling the weapon, or
enabling the weapon.

6. The medium of claim 1, wherein the storing the indoor geolocation and the weapon-tracker state data that comprises the weapon-tracker identifier in the database is in response to determining whether one or more signal transmission criteria are satisfied.

7. The medium of claim 1, wherein the operations further comprise:
augmenting the weapon-tracker state data to comprise names associated with facial recognition data, wherein augmenting includes implementing machine learning facial recognition techniques.

8. The medium of claim 1, wherein the operations further comprise:
establishing a wireless connection with the weapon-tracker from a pre-established source.

9. The medium of claim 1, wherein the operations further comprise:
receiving distress data from a third sensor associated with the weapon-tracker; and
augmenting the weapon-tracker state data to indicate that the distress data indicative of distress has been received.

10. The medium of claim 1, wherein the operations further comprise:
receiving device input data from an electronic device in communication with the weapon-tracker, wherein the weapon-tracker state data comprises the device input data.

11. The medium of claim 1, wherein the operations further comprise:
determining, with the one or more processors, an outdoor geolocation of the weapon-tracker based on second location data received from a third sensor associated with the weapon-tracker, wherein the outdoor geolocation includes a latitude coordinate and a longitude coordinate; and
switching, with the one or more processors, to using the first sensor to determine the indoor geolocation, when the outdoor geolocation does not satisfy one or more outdoor positioning criteria.

12. A system, comprising an apparatus that includes:
a non-transitory, machine-readable medium storing instructions that, when executed by a processor of a weapon-tracker, effectuate operations;
a housing in which the medium is disposed;
a clamp attached to the housing, wherein the clamp comprises:
a first jaw; and
a second jaw opposed to the first jaw;
a fastener attached to the first jaw and the second jaw, wherein the fastener is coupled to a portion of the first jaw and a portion of the second jaw;
a positioning system that includes an indoor position sensor to generate indoor geolocation sensor readings that include an indoor position of a plurality of indoor positions of an indoor space;
a charger attached to the housing;
a battery having an electrical connection with the charger; and
a first antenna to transmit a wireless signal.

13. The system of claim 12, wherein the positioning system comprises a second antenna to generate satellite signal sensor readings based on satellite signals received from a set of satellites.

14. The system of claim 12, wherein the operations comprise:
determining an indoor geolocation of the weapon-tracker based on the indoor geolocation sensor readings received from the positioning system;
receiving weapon use data from a second sensor associated with the weapon-tracker, wherein the weapon-tracker is associated with a weapon;
determining that a change in the weapon use data satisfies a change threshold, wherein the change indicates that the weapon has been operated; and in response to a determination that the change threshold is satisfied, storing the indoor geolocation and weapon-tracker state data that comprises a weapon-tracker identifier in a database.

15. The system of claim 12, the apparatus further comprising an induction coil, wherein the induction coil has an electrical connection with the battery.

16. The system of claim 12, the apparatus further comprising a rail segment that is attached to the housing, wherein the housing is disposed between the rail segment and the clamp, and wherein teeth in the rail segment protrude away from a center of the weapon-tracker.

17. The system of claim 12, further comprising a weapon having the processor and the medium.

18. The system of claim 12, further comprising a weapon wherein the housing is configured to be insertable into a cavity defined by a buttstock of the weapon.

19. The system of claim 12, the apparatus further comprising a sling coupled to the housing.

20. A computer-implemented method, comprising:
determining, by a computer, an indoor geolocation of a weapon-tracker based on first location data received from a first sensor associated with the weapon-tracker wherein the indoor geolocation includes an indoor position of a plurality of indoor positions of an indoor space;
receiving, by the computer, weapon use data from a second sensor associated with the weapon-tracker, wherein the weapon-tracker is associated with a weapon;
determining, by the computer, that a change in the weapon use data satisfies a change threshold, wherein the change indicates that the weapon has been operated; and
in response to a determination that the change threshold is satisfied, storing, by the computer, the indoor geolocation and weapon-tracker state data that comprises a weapon-tracker identifier in a database.

21. The method of claim 20, further comprising:
transmitting a message based on the weapon-tracker identifier and the indoor geolocation of the weapon-tracker to a client device, wherein the message indicates at least the indoor geolocation associated with the weapon-tracker.

22. The method of claim 20, further comprising:
determining that the weapon-tracker is located within a geofence based on the indoor geolocation.

23. The method of claim 22, further comprising:
in response to determining that the weapon-tracker is within the geofence, either:
disabling the weapon, or
enabling the weapon.

24. The method of claim 20, wherein the storing the indoor geolocation and the weapon-tracker state data that comprises the weapon-tracker identifier in the database is in response to determining whether one or more signal transmission criteria are satisfied.

25. The method of claim 20, further comprising:
augmenting the weapon-tracker state data to comprise names associated with facial recognition data, wherein augmenting includes implementing machine learning facial recognition techniques.

26. The method of claim 20, further comprising:
establishing a wireless connection with the weapon-tracker from a pre-established source.

27. The method of claim 20, further comprising:
receiving distress data from a third sensor associated with the weapon-tracker; and
augmenting the weapon-tracker state data to indicate that the distress data indicative of distress has been received.

28. The method of claim 20, further comprising:
receiving device input data from an electronic device in communication with the weapon-tracker, wherein the weapon-tracker state data comprises the device input data.

29. The method of claim 20, further comprising steps of determining the indoor geolocation of the weapon-tracker.

30. The method of claim 20, further comprising:
determining, with the computer, an outdoor geolocation of the weapon-tracker based on second location data received from a third sensor associated with the weapon- tracker, wherein the outdoor geolocation includes a latitude coordinate and a longitude coordinate; and
switching, with the computer, to using the first sensor to determine the indoor geolocation, when the outdoor geolocation does not satisfy one or more outdoor positioning criteria.

* * * * *